(12) United States Patent
Saito

(10) Patent No.: US 7,977,510 B2
(45) Date of Patent: Jul. 12, 2011

(54) FLUORINE-CONTAINING POLYETHER COMPOUND AND PROCESS FOR PRODUCING THE SAME

(75) Inventor: Satoru Saito, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 0 days.

(21) Appl. No.: 12/988,665

(22) PCT Filed: Apr. 21, 2009

(86) PCT No.: PCT/JP2009/057894
§ 371 (c)(1),
(2), (4) Date: Oct. 20, 2010

(87) PCT Pub. No.: WO2009/142085
PCT Pub. Date: Nov. 26, 2009

(65) Prior Publication Data
US 2011/0034729 A1    Feb. 10, 2011

(30) Foreign Application Priority Data
May 19, 2008    (JP) ................................ 2008-130303

(51) Int. Cl.
*C07C 233/05* (2006.01)
*C07C 231/02* (2006.01)

(52) U.S. Cl. .................. 564/155; 564/133; 564/142

(58) Field of Classification Search .................. 564/133, 564/142, 155
See application file for complete search history.

(56) References Cited

U.S. PATENT DOCUMENTS

| | | | |
|---|---|---|---|
| 4,356,291 A | 10/1982 | Darling | |
| 6,160,051 A * | 12/2000 | Tatsu et al. | 525/90 |
| 2006/0270791 A1* | 11/2006 | Kishita et al. | 524/861 |

FOREIGN PATENT DOCUMENTS

| | | |
|---|---|---|
| JP | 57-175185 A | 10/1982 |
| JP | 06-312952 A | 11/1994 |
| JP | 08-199070 | 8/1996 |
| JP | 08-301837 A | 11/1996 |
| JP | 11-343336 A | 12/1999 |
| JP | 2007-106942 A | 4/2007 |
| WO | WO 02/094969 A2 | 5/2002 |
| WO | WO 2008/126436 A1 | 10/2008 |

OTHER PUBLICATIONS

Miyaura, Norio et al., "Palladium-Catalyzed Cross-Coupling Reactions of Organoboron Compounds", Chemical Reviews, vol. 95, No. 7, 1995, pp. 2457-2483.
International Search Report from corresponding PCT application No. PCT/JP2009/057894 dated Jul. 17, 2009, 4 pgs.
International Preliminary Report on Patentability and Written Opinion from corresponding PCT application No. PCT/JP2009-057894, dated Jan. 20, 2010, 5 pgs.

* cited by examiner

Primary Examiner — Shailendra Kumar
(74) Attorney, Agent, or Firm — Brinks Hofer Gilson & Lione

(57) ABSTRACT

A fluorine-containing polyether compound having the following general formula:

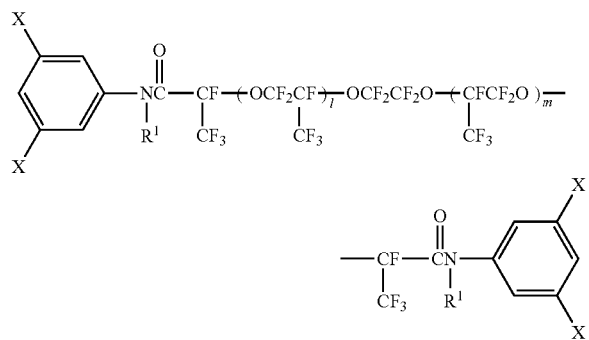

[I]

(where $R^1$ is a hydrogen atom, an alkyl group having 1 to 3 carbon atoms, or a phenyl group; X is a bromine atom or an iodine atom; l and m each are independently an integer of 10 or more; and l+m is 30-200) can be produced by reaction of a fluorine-containing dicarboxylic acid fluoride compound having the following general formula:

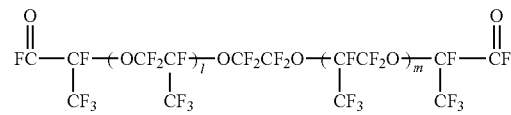

[II]

(where l and m each are independently an integer of 10 or more, and l+m is 30-200) with an aromatic amine compound having the following general formula:

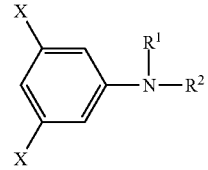

[III]

[where $R^1$ is a hydrogen atom, an alkyl group having 1 to 3 carbon atoms, or a phenyl group, $R^2$ is a hydrogen atom or a group represented by the general formula $-SiR^3R^4R^5$ (where $R^3$, $R^4$ and $R^5$ each are independently an alkyl group having 1 to 10 carbon atoms or a phenyl group); and X is a bromine atom or an iodine atom] preferably in the presence of pyridine or a tertiary amine compound such as triethylamine, etc.

6 Claims, No Drawings

FLUORINE-CONTAINING POLYETHER COMPOUND AND PROCESS FOR PRODUCING THE SAME

RELATED APPLICATION

This application is a 35 U.S.C. §371 national phase filing of International Patent Application No. PCT/JP2009/057894, filed Apr. 21, 2009, through which and to which priority is claimed under 35 U.S.C. §119 to Japanese Patent Application No. 2008-130303, filed May 19, 2008.

TECHNICAL FIELD

The present invention relates to a fluorine-containing polyether compound and a process for producing the same, and more particularly to a fluorine-containing polyether compound having a halogenophenyl group each at both terminals of polymer main chain as a reactive site, and a process for producing the same.

BACKGROUND ART

Fluorine-containing polyether compounds having functional groups at the terminals of molecule, for example, represented by the following general formula are known (Patent Document 1):

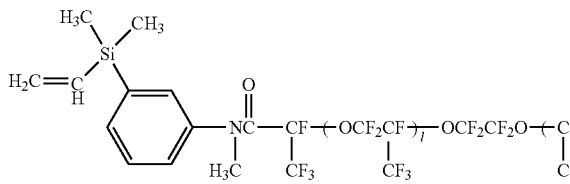
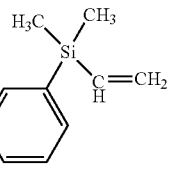

More general compounds obtained by oligomerizing the main chain structure of the afore-mentioned compounds and represented by the following general formula are also known (Patent Document 2):

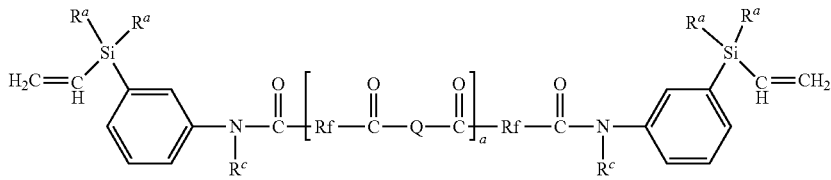

It is disclosed that a series of compounds represented by these general formulae can give elastomeric moldings having much distinguished characteristics (chemical resistance, heat resistance, and low-temperature characteristics) by curing with a fluorine-containing organo hydrogen siloxane compound having a plurality of Si—H groups in the molecule in the presence of a platinum compound catalyst, and the moldings can be used particularly even at low temperatures such as about −50° C. without losing the flexibility. Curable compositions comprising these compounds as the main component have a remarkable molding processability and can undergo even RIM molding. However, the cured products have siloxane bonds in the intramolecular cross-linked structure, and thus may give undesirable effects such as chemical deterioration and the resulting lowered mechanical strength, when used in the presence of an acidic substance such as hydrogen fluoride, etc.

PRIOR ART LITERATURE

Patent Literature

Patent Document 1: JP-A-11-343336
Patent Document 2: JP-B-2990646
Patent Document 3: WO 2008/126436 A1

Non-Patent Document

Non-Patent Document 1: Chem. Rev. 95, 2457 (1995)

SUMMARY OF THE INVENTION

Problem to be Solved by the Invention

The present inventor previously proposed a fluorine-containing polyether compound represented by the following general formula:

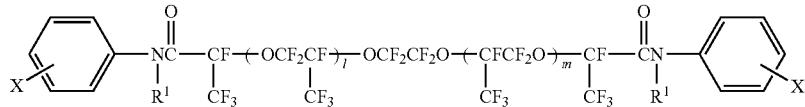

(where $R^1$ is a hydrogen atom, an alkyl group having 1 to 3 carbon atoms, or a phenyl group; X is an iodine atom or a bromine atom; X-substituted position on the phenyl group is at a m- or p-position relative to the position of $NR^1$ bond substituent; l and m each are independently an integer of 10 or more; and l+m is 30-130) as a fluorine-containing polyether compound capable of curing without using a fluorine-containing organo hydrogen siloxane compound having Si—H bonds, also capable of giving cured products having distinguished heat resistance, low-temperature characteristics and molding processability, and usable even under an acidic condition (Patent Document 3).

The object of the present invention is to provide a fluorine-containing polyether compound having a more reactive halogenophenyl group each at both terminals of polymer main chain and a process for producing the same.

Means for Solving the Problem

The present invention provides a fluorine-containing polyether compound represented by the following general formula:

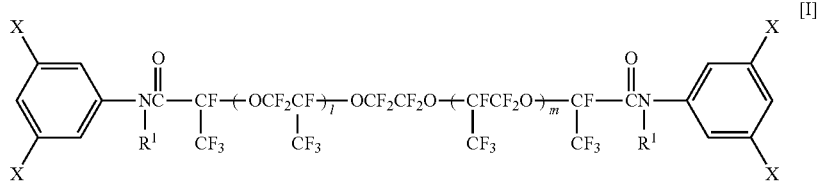

(where $R^1$ is a hydrogen atom, an alkyl group having 1 to 3 carbon atoms, or a phenyl group; X is a bromine atom or an iodine atom; l and m each are independently an integer of 10 or more; and l+m is 30-200).

The fluorine-containing polyether compound can be produced by allowing a fluorine-containing dicarboxylic acid fluoride compound represented by the following general formula:

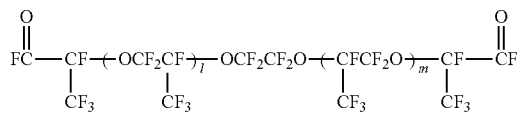

(where l and m each are independently an integer of 10 or more, and l+m is 30-200) to react with an aromatic amine compound represented by the following general formula, preferably in the presence of pyridine, or a tertiary amine compound such as triethylamine, etc.

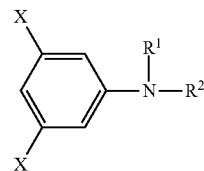

[where $R^1$ is a hydrogen atom, an alkyl group having 1 to 3 carbon atoms, or a phenyl group; $R^2$ is a hydrogen atom, or a group represented by the general formula —$SiR^3R^4R^5$ (where $R^3$, $R^4$ and $R^5$ each are independently an alkyl group having 1 to 10 carbon atoms or a phenyl group) and X is a bromine atom or an iodine atom].

Effect of the Invention

The present fluorine-containing polyether compound has two bromine atoms or two iodine atoms each as substituted for the hydrogen atoms on the phenyl group at both terminals of polymer main chain, and thus is more reactive. For example, when the present fluorine-containing polyether compound is cured under appropriate curing conditions to obtain elastomeric moldings, not only rapid curing can be attained, but also physical properties of final moldings can be improved. The moldings obtained by curing the compound have distinguished low-temperature characteristics, chemical resistance, etc., and thus are suitable for various uses such as seal materials for automobile fuel supply systems, oil seal materials, seal materials for aviation fuel systems and hydraulic systems, seal materials for semi-conductor production systems, etc.

EMBODIMENTS FOR CARRYING OUT THE INVENTION

In the following general formula of the present fluorine-containing polyether compound:

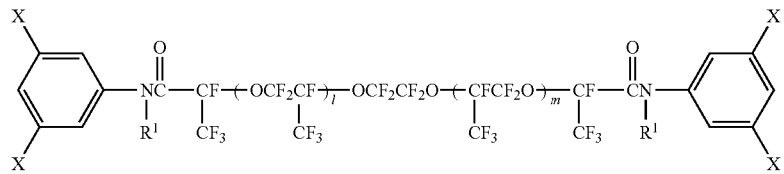

l and m each are independently an integer of 10 or more and l+m is an integer of 30-200. Particularly, when used as the main raw material for the elastomeric polymer material, l+m is preferably 50-150 for producing moldings having a sufficient mechanical strength after the curing. $R^1$ is a hydrogen atom, an alkyl group having 1 to 3 carbon atoms, or a phenyl group, and to avoid formation of intramolecular hydrogen bonds and side reaction during the curing, the alkyl group or the phenyl group is preferable, and a methyl group is particularly preferable from the viewpoint of easy production. X is a bromine atom or an iodine atom.

The present fluorine-containing polyether compound can be produced through, for example, a series of the following steps:

The reaction of the fluorine-containing dicarboxylic acid fluoride [II] with the aromatic amine compound [III] can be carried out in the presence of an active hydrogen-free, basic nitrogen-containing heterocyclic compound such as pyridine, etc., or a tertiary amine compound such as triethylamine, etc. in a fluorine-containing solvent such as hydrochlorofluorocarbon, hydrofluorocarbon, hydrofluoroether, etc., or a solvent mixture of the fluorine-containing solvent with an aprotic, non-fluorine-based solvent at a reaction temperature of −50° to 150° C., preferably 0° to 100° C. The fluorine-containing solvent includes, for example, HCFC-225, HFE-449

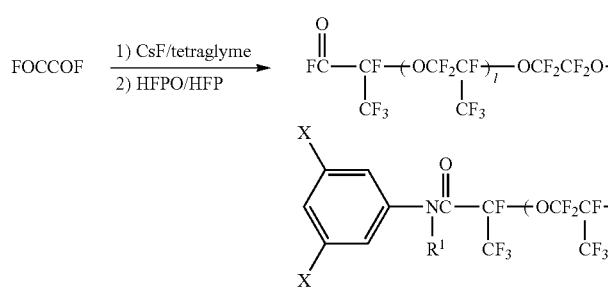
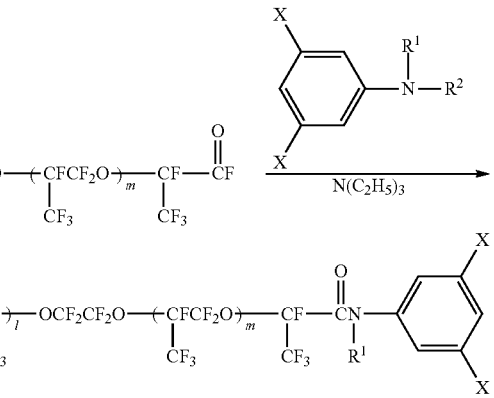

Remarks) HFPO: Hexafluoropropene oxide

HFP: Hexafluoropropene

In the aromatic amine compound [III] used in the final step, $R^1$ is a hydrogen atom, an alkyl group having 1 to 3 carbon atoms, or a phenyl group, $R^2$ is a hydrogen atom or a group represented by the general formula —$SiR^3R^4R^5$, where $R^3$, $R^4$, and $R^5$ each are independently an alkyl group having 1 to 10 carbon atoms, or a phenyl group, and the alkyl groups of $R^3$, $R^4$, and $R^5$ include, for example, —$CH_3$, —$C_2H_5$, —$(CH_2)_2CH_3$, —$CH(CH_3)_2$, —$C(CH_3)_2$, —$C(CH_3)_2CH(CH_3)_2$, etc. X is a bromine atom, or an iodine atom.

(HFE-7100, a product of Sumitomo 3M Co.), HFE-569 (HFE-7200, a product of Sumitomo 3M Co.), 1,3-bis(trifluoromethyl)benzene, etc. The aprotic, non-fluorine-based solvent includes, for example, diethyl ether, diisopropyl ether, cyclopentyl methyl ether, etc. From the viewpoint of solubility of the aromatic amine compound [III], it is more preferable to use a solvent mixture of the fluorine-containing solvent with the aprotic, non-fluorine-based solvent.

The present fluorine-containing polyether compound can serve as the main component of curable compositions as will be described later. The present fluorine-containing polyether compound includes, for example, the following compounds:

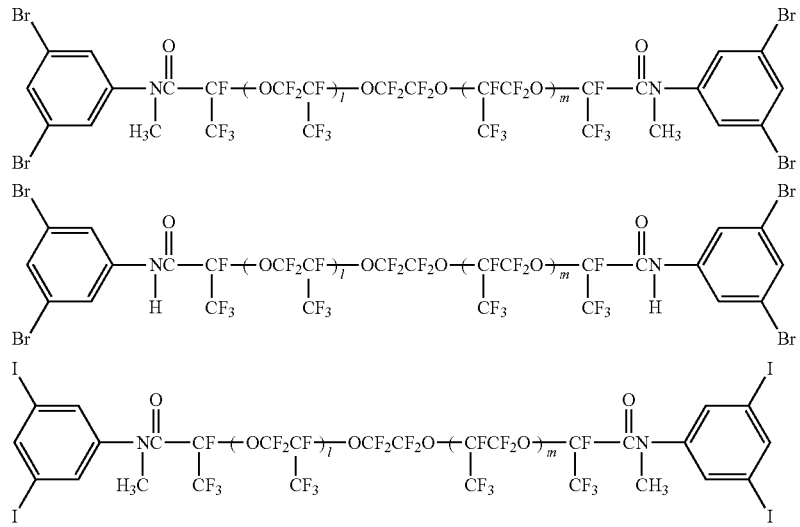

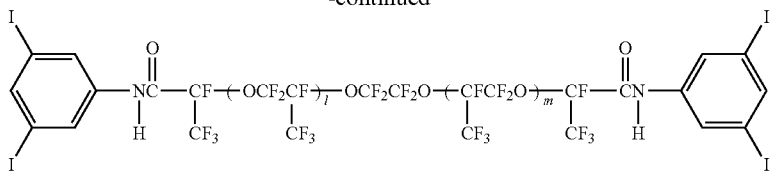

One example of curable compositions containing the present fluorine-containing polyether compound [Component (A)] as a main component comprises the following components:

|  |  | Parts by weight |
| --- | --- | --- |
| Component (A): | Fluorine-containing polyether compound | 100 |
| Component (B): | Aromatic di- or tri-boronic acid ester compound | 1-10 |
| Component (C): | Zero-valent or divalent organo-palladium compound | 0.0001-1 |
| Component (D): | Basic inorganic or organic compound | 0.5-10 |
| Component (E): | Organophosphorus compound | 0-5 |

Curing reaction of the above-mentioned curable composition is based on cross-coupling reaction (Suzuki-Miyaura reaction) of arylboronic acid or its ester with aryl halide in the presence of a palladium catalyst (Non-Patent Document 1).

inner temperature was adjusted to −33° to −30° C., and then 40 g of hexafluoropropene was charged therein through the gas inlet. Then, hexafluoropropene oxide and hexafluoropropene were charged into the reactor vessel at feed rates of 10 g/hr and 4 g/hr, respectively. 42 hours thereafter, gas feeding was discontinued (total amount of charged hexafluoropropene oxide: 428 g), and the inner temperature was further kept at −33° to −30° C. for one hour. The hexafluoropropene was removed under reduced pressure, and then the inner temperature was slowly elevated to room temperature and then further to 100° C. to remove hexafluoropropene oligomers from the reaction mixture under reduced pressure. In this manner, 478 g of a mixture of cesium fluoride, tetraglyme and fluorine-containing dicarboxylic acid fluoride was obtained as a yellowish, viscous suspension, and used in the next step without purification.

A portion of the above-mentioned mixture was converted to diester compound [A] by methanol and subjected to determination of a number average polymerization degree of hexafluoropropene oxide and a bifunctionality ratio (mole fraction relative to hexafluoropropene oxide oligomer [B]):

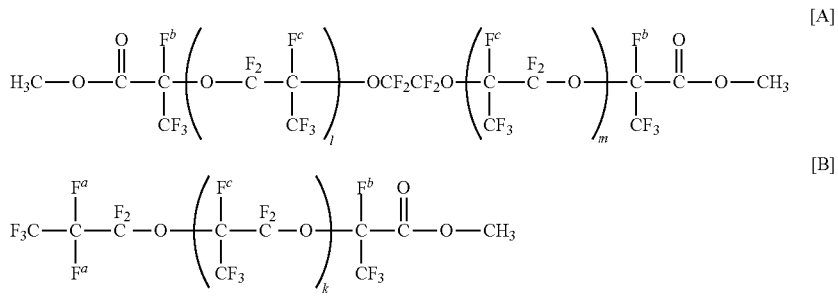

EXAMPLES

The present invention will be described in detail below, referring to Examples.

Reference Example 1

Preparation of fluorine-containing dicarboxylic acid fluoride represented by the following general formula:

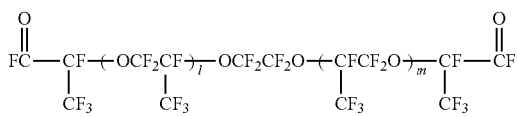

A glass reactor vessel having a net capacity of 1 L, provided with a stirrer, a temperature sensor, a gas inlet and a dry ice/ethanol cooling condenser, was placed in a low-temperature thermostat tank, and 60 g of tetraglyme solution containing 23 millimoles of a dialkoxide compound $CsOCF_2CF(CF_3)OCF_2CF_2OCF(CF_3)CF_2OCs$ was charged therein. The $s=F^a(-131$ ppm) Peak integration value
$t=F^b(-133$ ppm) Peak integration value
$u=F^c(-146$ ppm) Peak integration value
Remark) Chemical shift was based on $CFCl_3$
Bifunctionality ratio=$(t/s-0.5)/(t/s+0.5)=0.89$
Number average polymerization degree of hexafluoropropene oxide=$4u/(2t+s)=102$

Example 78 g (about 4.5 millimoles) of the mixture of fluorine-containing dicarboxylic acid fluoride, cesium fluoride, and tetraglyme obtained in Reference Example 1 was dissolved into 90 ml of a fluorine-containing solvent (HFE-7100, a product of Sumitomo 3M Co.), and 2.1 g (21 millimoles) of triethylamine and 36 ml of diethyl ether were added thereto. Then, 3.1 g (11 millimoles) of 3,5-dibromo-N-methylaniline was added thereto to conduct reaction at 30° C. for 2 hours. The resulting reaction mixture was admixed with a saturated saline, and the separated organic layer was dried over anhydrous magnesium sulfate and recovered by filtration. The recovered filtrate was distilled under reduced pressure to remove the fluorine-containing solvent and the diethyl ether.

The resulting viscous liquid was washed with diethyl ether several times and then the diethyl ether was completely distilled off under reduced pressure. In this manner, 68 g of fluorine-containing polyether compound [PFPE-Br$_2$] represented by the following general formula was obtained as a slightly yellowish, clear liquid. The viscosity was found to be 15 Pa·s (25° C.), when determined by an E type viscometer (TEV-22, made by Toki Sangyo Co.).

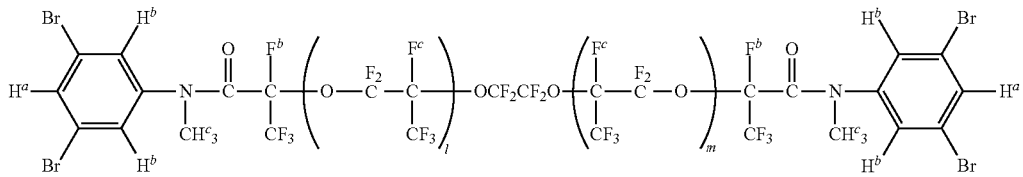

$^{19}$F-NMR (Chemical shift was based on CFCl$_3$:
  −124 ppm(F$^b$)
  −147 ppm(F$^c$)
$^1$H-NMR (Chemical shift was based on TMS):
  7.6 ppm(H$^a$)
  7.3 ppm(H$^b$)
  3.2 ppm(H$^c$)
IR(neat):
  1709 cm$^{-1}$(C=O)
  1561 cm$^{-1}$(Ar)
  1583 cm$^{-1}$(Ar)

Reference Example 2

|  | Parts by weight |
|---|---|
| Fluorine-containing polyether compound of Example 1-(1H,1H,2H,2H,3H,3H-perfluorononan-1-yloxy)-3,5-bis-(4,4,5,5-tetramethyl-1,3,2-dioxaborolan-2-yl)benzene | 100<br>8 |

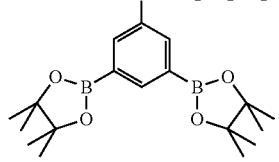

| Palladium acetate | 0.032 |
| Triphenylphosphine | 0.073 |
| Potassium phosphate | 7.2 |

The foregoing components were added to a solvent mixture consisting of 125 parts by weight of ethanol, 25 parts by weight of water, and 400 parts by weight of 1,3-bis(trifluoromethyl)benzene, mixed together in a nitrogen atmosphere at room temperature for 5 minutes, and then volatile materials were removed therefrom at room temperature under reduced pressure. The resulting mixture was admixed with 13 parts be weight of acetylene carbon black to prepare a curable composition.

The curable composition was subjected to determination of curing behavior at 130° C. for 30 minutes, using a Monsanto disc Rheometer, and the following results were obtained
  ML 0.6 dN·m
  MH 6.6 dN·m
  t$_{10}$ 0.7 minutes
  t$_{50}$ 1.0 minute
  t$_{90}$ 1.7 minutes The curable composition was compression molded at 130° C. for 15 minutes to form P24 O rings, followed by oven vulcanization (secondary vulcanization) in a nitrogen atmosphere at 80° C. for 5 hours and at 230° C. for 15 hours. The P24 O rings were subjected to determination of compression set (according to ASTM D395 method B: 200° C. for 70 hours), and found to have a compression set of 53%.

The P24 O rings were also subjected to determination of glass transition temperature Tg, using a differential scanning calorimetric analyser (DSC6220, made by SII Nanotechnology Co.), which was found to be −55° C.

The invention claimed is:

1. A fluorine-containing polyether compound represented by the following general formula:

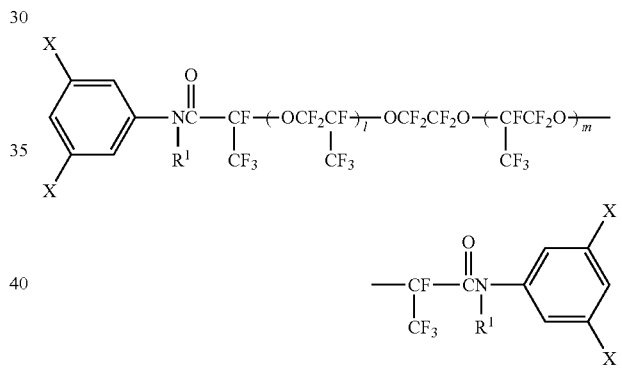

(wherein R$^1$ is a hydrogen atom, and alkyl group having 1 to 3 carbon atoms, or a phenyl group; X is a bromine atom or an iodine atom; l and m each are independently an integer of 10 or more; and l+m is 30-200).

2. A fluorine-containing polyether compound according to claim 1, wherein X is a bromine atom.

3. A fluorine-containing polyether compound according to claim 1, wherein R$^1$ is a methyl group.

4. A fluorine-containing polyether compound according to claim 1, wherein l+m is 50-150.

5. a process for producing a fluorine-containing polyether compound according to claim 1, said process comprising allowing a fluorine-containing dicarboxylic acid fluoride compound represented by the following general formula:

[II]

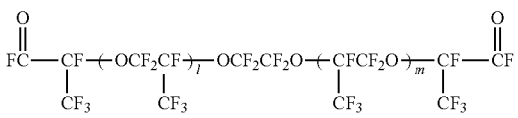

(where l and m each are independently an integer of 10 or more, and l+m is 30-200) to react with an aromatic amine compound represented by the following general formula:

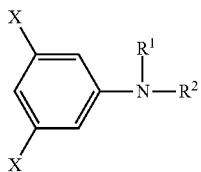

[III]

(where $R^1$ is a hydrogen atom, an alkyl group having 1 to 3 carbon atoms, or a phenyl group; $R^2$ is a hydrogen atom or a group represented by the general formula —$SiR^3R^4R^5$ (wherein $R^3$, $R^4$ and $R^5$ each are independently an alkyl group having 1 to 10 carbon atoms or a phenyl group); and X is a bromine atom or an iodine atom).

6. A process for producing a fluorine-containing polyether compound according to claim 5, wherein the reaction is carried out in the presence of pyridine or a tertiary amine compound.

* * * * *